US008023044B2

(12) United States Patent
Yasuda et al.

(10) Patent No.: US 8,023,044 B2
(45) Date of Patent: Sep. 20, 2011

(54) IMAGE DISPLAY DEVICE RESTRICTING OPERATION WHILE INFORMATION SCREEN IS DISPLAYED, IMAGE DISPLAYING METHOD AND MEDIUM STORING PROGRAM THEREOF

(75) Inventors: Akimitsu Yasuda, Tokyo (JP); Takeshi Kono, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1128 days.

(21) Appl. No.: 11/662,002

(22) PCT Filed: Nov. 17, 2005

(86) PCT No.: PCT/JP2005/021125
§ 371 (c)(1),
(2), (4) Date: Jun. 18, 2007

(87) PCT Pub. No.: WO2006/059488
PCT Pub. Date: Jun. 8, 2006

(65) Prior Publication Data

US 2008/0055490 A1 Mar. 6, 2008

(30) Foreign Application Priority Data

Dec. 3, 2004 (JP) ................................ 2004-352105

(51) Int. Cl.
*H04N 5/44* (2011.01)
*H04N 9/77* (2006.01)
*G06F 13/00* (2006.01)
*G06F 11/00* (2006.01)

(52) U.S. Cl. ........ 348/553; 348/714; 345/505; 345/522; 345/531; 463/43

(58) Field of Classification Search .................. 348/563, 348/564, 569, 714, 716, 718, 588, 553; 345/503, 345/505, 522, 531, 533, 535, 556, 561, 565; 463/43; 719/323; 386/353
See application file for complete search history.

(56) References Cited

U.S. PATENT DOCUMENTS 5,142,618 A * 8/1992 Fujiwara et al. .............. 715/210
(Continued)

FOREIGN PATENT DOCUMENTS

JP 60-225934 11/1985
(Continued)

OTHER PUBLICATIONS

Korean Office Action for KO application 10-2007-7008775, Sep. 30, 2008.

(Continued)

*Primary Examiner* — Victor Kostak
(74) *Attorney, Agent, or Firm* — Matthew B. Dernier, Esq.; Gibson & Dernier LLP

(57) ABSTRACT

An image display device includes an operation unit having a plurality of operating members configured to input operation data indicative of content of a user's operation; an operation data storage unit configured to store the operation data; an application process execution unit configured to execute a predetermined application process based on the operation data; an information screen display operation detection unit configured to detect a predetermined information screen display operation; an information screen display unit configured to display an information screen in a display unit when the information screen display operation detection unit detects information screen display operation; and an operation invalidation flag storage unit configured to store an operation invalidation flag in a manner in which it corresponds to a part or all of the operation data when the operation data satisfies a predetermined condition during the information screen is displayed.

4 Claims, 6 Drawing Sheets

U.S. PATENT DOCUMENTS

| | | | | |
|---|---|---|---|---|
| 5,283,866 | A | 2/1994 | Kumagai | |
| 5,553,170 | A | 9/1996 | Kumagai | |
| 6,037,929 | A | 3/2000 | Ogura et al. | |
| 6,278,467 | B1 * | 8/2001 | Kuwajima et al. | 345/531 |
| 2002/0145611 | A1 * | 10/2002 | Dye et al. | 345/543 |
| 2003/0016224 | A1 * | 1/2003 | Tamai | 345/506 |

FOREIGN PATENT DOCUMENTS

| | | | |
|---|---|---|---|
| JP | 06332613 | A | 2/1994 |
| JP | 06332613 | A | 12/1994 |
| JP | 07-013549 | | 1/1995 |
| JP | 7-44122 | | 2/1995 |
| JP | 0863322 | A | 3/1996 |
| JP | 9081118 | | 3/1997 |
| JP | 1078850 | A | 3/1998 |
| JP | 11-296157 | | 10/1999 |
| JP | 2001134416 | | 5/2001 |
| JP | 2004-153384 | | 5/2004 |

OTHER PUBLICATIONS

Partial translation of an Office Action of Japanese Patent Application No. 2004-352104 dated Apr. 8, 2008.

Partial translation of an Office Action of Japanese Patent Application No. 2004-352104 dated Oct. 16, 2007.

Partial translation of an Office Action of Japanese Patent Application No. 2004-352103 dated Nov. 6, 2007.

Partial translation of an Office Action of Japanese Patent Application No. 2004-352105 dated May 8, 2007.

Int'l Search Report, Mar. 7, 2006.

* cited by examiner

FIG.5
ORDER TO RENDER ↓
| ELEMENT IMAGE ID | RENDERING FLAG |
|---|---|
| 1 | 1 |
| 2 | 1 |
| 3 | 0 |
| 4 | 0 |
| 5 | 0 |
FIG.6
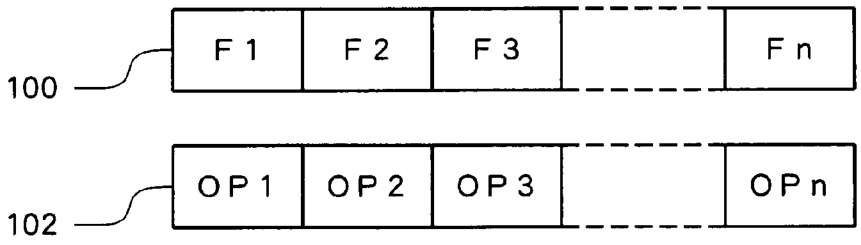
FIG.7
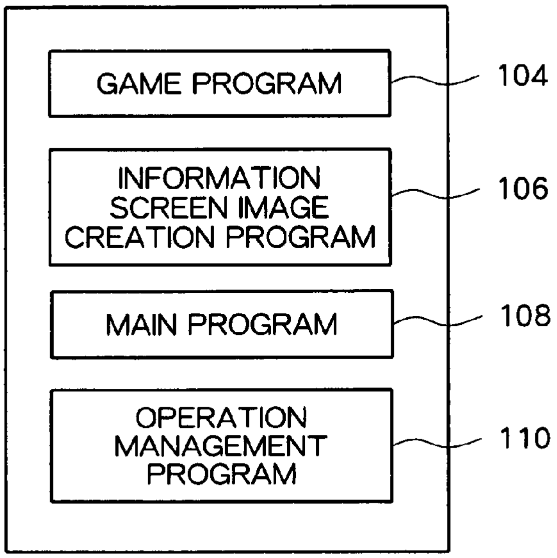

IMAGE DISPLAY DEVICE RESTRICTING OPERATION WHILE INFORMATION SCREEN IS DISPLAYED, IMAGE DISPLAYING METHOD AND MEDIUM STORING PROGRAM THEREOF

BACKGROUND OF THE INVENTION

1. Field of the Invention

The present invention relates to an image display device, an image display method, and a program.

2. Description of the Related Art

Among games programs, some may show an information screen image on a computer screen in response to a predetermined information screen display operation carried out relative to the computer, such as a game device, or the like, while the game is being played. The information screen may be a pause screen for temporarily suspending or forcibly terminating the game, for example.

Display of various information items, including a time indicator, the residual amount of battery power used in the portable game device, or the like, on the information screen allows the user to continue playing the game while being aware of such useful information. However, when an information screen is shown while the game is being played, suspension of game operation each time the information screen is displayed is inconvenient. Therefore, an arrangement is desired in which continuation of the game operation is allowed as long as no inconvenience is incurred, even while the information screen is being displayed.

A game program according to the above-described background art comprises a program for showing an information screen in addition to the game program. Regardless of whether a user can utilize such a function for showing an information screen depends on whether the game program includes a program for that function. When no such program is included, a problem is caused wherein the user is unable to use this useful function.

Many of the game programs according to the above-described background art are defined so as to write images for one frame into a display buffer for a predetermined period of time and then to sequentially read, from the display buffer, the color data for pixels constituting the images to be shown on the display, such as an LCD (liquid crystal display), a CRT (cathode ray tube), or the like.

However, such a program is subject to the problem of distorted display when data for one frame cannot be completely written into the display buffer within a predetermined period of time due to an excessively large amount of images to be displayed.

The present invention has been conceived in view of the above, and the first object thereof is to provide an image display device, an image display method, and a program, all capable of continuing operation relative to an application such as a game or the like under a certain condition when an information screen is shown while the application is being run.

Furthermore, the second object of the present invention is to provide an image display device, an image display method, and a program, all capable of displaying an information screen while an application is run, without using the program of an application such as a game.

Moreover, the third object of the present invention is to provide an image display device, an image display method, and a program, all capable of preferable displaying a larger number of images.

SUMMARY OF THE INVENTION

In order to attain the above-described first object, according to the present invention, there is provided an image display device, comprising operation means having a plurality of operating members, for inputting operation data indicative of content of operation relative to each of the operating members, operation data storage means for storing operation data indicative of content of operation relative to each of the operating members and input via the operation means, application process execution means for executing a predetermined application process based on the operation data stored in the operation data storage means, information screen display operation detection means for detecting a predetermined information screen display operation, information screen display means for displaying an information screen in the display means when the information screen display operation detection means detects the information screen display operation, and operation invalidation flag storage means for storing an operation invalidation flag so as to correspond to a part or all of the operation data stored in the operation data storage means when the information screen display operation detection means detects the information screen display operation and the operation data input via the operation means satisfies a predetermined condition, wherein the application process execution means modifies the operation data stored in the operation data storage means according to the operation invalidation flag stored in the operation invalidation flag storage means, and executes the predetermined application process according the operation data modified.

According to another aspect of the present invention, there is provided an image displaying method, comprising an operation data storage step of storing operation data input via an operation means having a plurality of operation members, for inputting operation data indicative of content of operation relative to each of the operation members, and indicative of content of operation relative to each of the operating members in an operation data buffer, an application process execution step of executing a predetermined application process based on the operation data stored in the operation data buffer, an information screen display operation detection step of detecting a predetermined information screen display operation, an information screen display step of displaying an information screen in display means when the information screen display operation is detected during the information screen display operation detection step, and an operation invalidation flag storage step of storing an operation invalidation flag in the storage means so as to correspond to a part or all of the operation data stored in the operation data buffer when the information screen display operation is detected during the information screen display operation detection step and the operation data input via the operation means satisfies a predetermined condition, wherein during the application process execution step, the operation data stored in the operation data buffer is modified according to the operation invalidation flag stored in the storage means, and the predetermined application process is carried out according the operation data According to a further aspect of the present invention, there is provided a program for causing a computer to function as operation means, having a plurality of operating members, for inputting operation data indicative of content of operation relative to each of the operating members, operation data storage means for storing the operation data indicative of content of operation relative to each of the operating members and input via the operation means, application process execution means for executing a predetermined application process based on the operation data stored in the operation data storage means, information screen display operation detection means for detecting a predetermined information screen display operation, information screen display means for displaying an information screen in the display means when the information screen display operation detection means detects information screen display operation, and operation invalidation flag storage means for storing an operation invalidation flag so as to correspond to a part or all of the operation data stored in the operation data storage means when the information screen display operation detection means detects information screen display operation and operation data input via the operation means satisfies a predetermined condition, wherein the application process execution means modifies the operation data stored in the operation data storage means according to the operation invalidation flag stored in the operation invalidation flag storage means, and executes a predetermined application process according the operation data modified.

A computer may, for example, be a variety of game devices, a portable electronic device, a personal computer, various server computers, and so forth. The program may be stored in various computer readable information storage media.

According to the present invention, when a predetermined information screen display operation is detected and the operation data satisfies a predetermined condition, an operation invalidation flag may be stored so as to correspond to a part or all of the operation data. Then, the operation data may be modified according to the operation invalidation flag, and an application process is carried out according the modified operation data.

When an information screen display operation is detected—as the operation data modified according to the operation invalidation flag is not used for an application process unless the operation data satisfies a predetermined condition—operation relative to the application process can be continued.

In the above, the information screen display means may update the information screen according to the operation data stored in the operation data storage means. This arrangement makes it possible to operate the information screen. It should be noted that it is preferable that, when an information screen display operation is detected, update of the information screen according to the operation data stored in the operation data storage means is limited (prohibited) until the operation data satisfies a predetermined condition.

In order to attain the above-described second object, according to the present invention, there is provided an image display device, comprising application screen image creation means for creating a predetermined application screen image, application screen image storage means for storing the application screen image created by the application screen image creation means, operation detection means for detecting a predetermined information screen display operation, information screen image creation means for creating a predetermined information screen image when the operation detection means detects the information screen display operation, information screen image storage means for storing the information screen image created by the information screen image creation means, and display object switching means for switching the object to be displayed in the display means from the application screen image stored in the application screen image storage means to the information screen image stored in the information screen image storage means when the operation detection means detects the information screen display operation.

According to another aspect of the present invention, there is provided an image display method, comprising an application screen image creation step of creating a predetermined application screen image, an application screen image storage step of storing the application screen image created during the application screen image creation step in a first display buffer, an operation detection step of detecting a predetermined information screen display operation, an information screen image creation step of creating a predetermined information screen image when the information screen display operation is detected during the operation detection step, an information screen image storage step of storing the information screen image created during the information screen image creation step in a second display buffer separate from the first display buffer, and a display object switching step of switching an object to be displayed in the display means from the application screen image stored in the first display buffer to the information screen image stored in the second display buffer when the information screen display operation is detected during the operation detection step.

According to a further aspect of the present invention, there is provided a program for causing a computer to function as application screen image creation means for creating a predetermined application screen image, application screen image storage means for storing the application screen image created by the application screen image creation means, operation detection means for detecting a predetermined information screen display operation, information screen image creation means for creating a predetermined information screen image when the operation detection means detects the information screen display operation, information screen image storage means for storing the information screen image created by the information screen image creation means, and display object switching means for switching an object to be displayed in the display means from the application screen image stored in the application screen image storage means to the information screen image stored in the information screen image storage means when the operation detection means detects the information screen display operation.

A computer may, for example, be a variety of game devices, a portable electronic device, a personal computer, various server computers, and so forth. The program may be stored in various computer readable information storage media.

According to the present invention, the created application screen image is stored in the application screen image storage means, whereas the created information screen image is stored in the information screen image creation means. When a predetermined information screen display operation is detected, the object to be displayed in the display means is switched from the application screen image stored in the application screen image storage means to the information screen image stored in the information screen image storage means. This arrangement makes it possible to display an information screen while an application is being run, irrespective of the application program such as a game.

In the above, the display means may sequentially read and display color data for each of the pixels for use to display the application screen image stored in the application screen image storage means, and the display object switching means may detect a blank period during which the display means does not sequentially read the color data for the respective pixels and display the pixels, and switches the object to be displayed in the display means according to such detection. With this arrangement, while an information screen image is being stored in the information screen image storage means, that state can be prevented from being displayed in the display means so that preferable switching to the information screen can be attained.

Further in the above, when the operation detection means detects the information screen display operation, creation of the application screen image by the application screen image creation means and creation of the information screen image by the information screen image creation means may be repetitively carried out for every predetermined period of time. With this arrangement, the creation of an application screen image can be continued even during the creation and display of an information screen image.

Still further in the above, the information screen display operation may be the operation of pressing a predetermined button a predetermined number of times, which is twice or more frequently, and when the predetermined button is pressed fewer than the predetermined number of times, brightness of the display means may be changed according to the number of times the predetermined button was pressed. This arrangement makes it possible to display the information screen image, using a button for changing the brightness of the display means.

In order to achieve the above-described third object, according to the present invention, there is provided an image display device for displaying an image rendered in the image storage means, comprising rendering flag storage means for storing, as for a plurality of element images constituting a display object image, a rendering flag indicating whether a relevant element image is already rendered into the image storage means, rendering means for rendering images into the image storage means, for every predetermined period of time, some or all of the element images—with respect to which a rendering flag indicating that the relevant element image is yet to be rendered in the image storage means—are stored in the rendering flag storage means, and display means for displaying an image already rendered in the image storage means According to another aspect of the present invention, there is provided an image display method for sequentially reading, for a predetermined period of time, the content stored in a display buffer where an image is rendered, comprising a step of storing in the memory, as for a plurality of element images constituting a display object image, a rendering flag indicating whether a relevant element image is already rendered into the display buffer, and a step of rendering in the display buffer, for every predetermined period of time, some or all of the element images—with respect to which a rendering flag indicating that the relevant element image is yet to be rendered in the display buffer—are stored in the memory.

According to a further aspect of the present invention, there is provided a program for causing a computer to function as an image display device for displaying an image rendered in image storage means, a program causing the computer to function as a rendering flag storage means for storing, as for a plurality of element images constituting a display object image, a rendering flag indicating whether a relevant element image is already rendered into the image storage means, rendering means for rendering into the image storage means, for every predetermined period of time, some or all of the element images—with respect to which a rendering flag indicating that the relevant element image is yet to be rendered in the image storage means—are stored in the rendering flag storage means, and display means for displaying, for every predetermined period of time, an image already rendered in the image storage means.

A computer may, for example, be a variety of game devices, a portable electronic device, a personal computer, various server computers, and so forth. The program may be stored in various computer readable information storage media.

According to the present invention, it is arranged, while utilizing a rendering flag, such that an element image yet to be rendered into the image storage means (a display buffer) is rendered for every predetermined period of time. This arrangement makes it possible to omit a rendering process relevant to the element image already rendered in the image storage means so that a larger number of images can be preferably displayed when the display is updated for every predetermined period of time.

In the above, the display means may sequentially read and display content stored in the image storage means, and the rendering means may detect a blank period in which the display means does not sequentially read the content stored in the image storage means and display the content, and render some or all of the element images into the image storage means according to the detection. This arrangement makes it possible to prevent an image being rendered from being displayed in the display means. Consequently, a more preferable image display can be attained.

In the above, the rendering means may determine the remaining time of the blank period, and determines the number of element images to be rendered into the image storage means depending on the remaining period of time determined. This arrangement makes it possible to gradually increase, for every predetermined period of time, the number of element images rendered in the image storage means, and also to eliminate a problem in which an element image is rendered during a period other than a blank period (for example, a vertical blank period).

BRIEF DESCRIPTION OF THE DRAWINGS

FIG. 5 is a diagram showing a rendering flag table;

FIG. 6 is a diagram showing an operation data buffer and an operation invalidation flag;

FIG. 7 is a diagram showing the structure of a program executed by a portable electronic device;

DESCRIPTION OF THE PREFERRED EMBODIMENTS

In the following, one embodiment of the present invention will be described in detail with reference to the accompanying drawings. Here, a portable electronic device that functions as a portable game device, a portable music player, and a portable digital assistance (PDA) will be described as an image display device according to an embodiment of the present invention.

Figure 1:
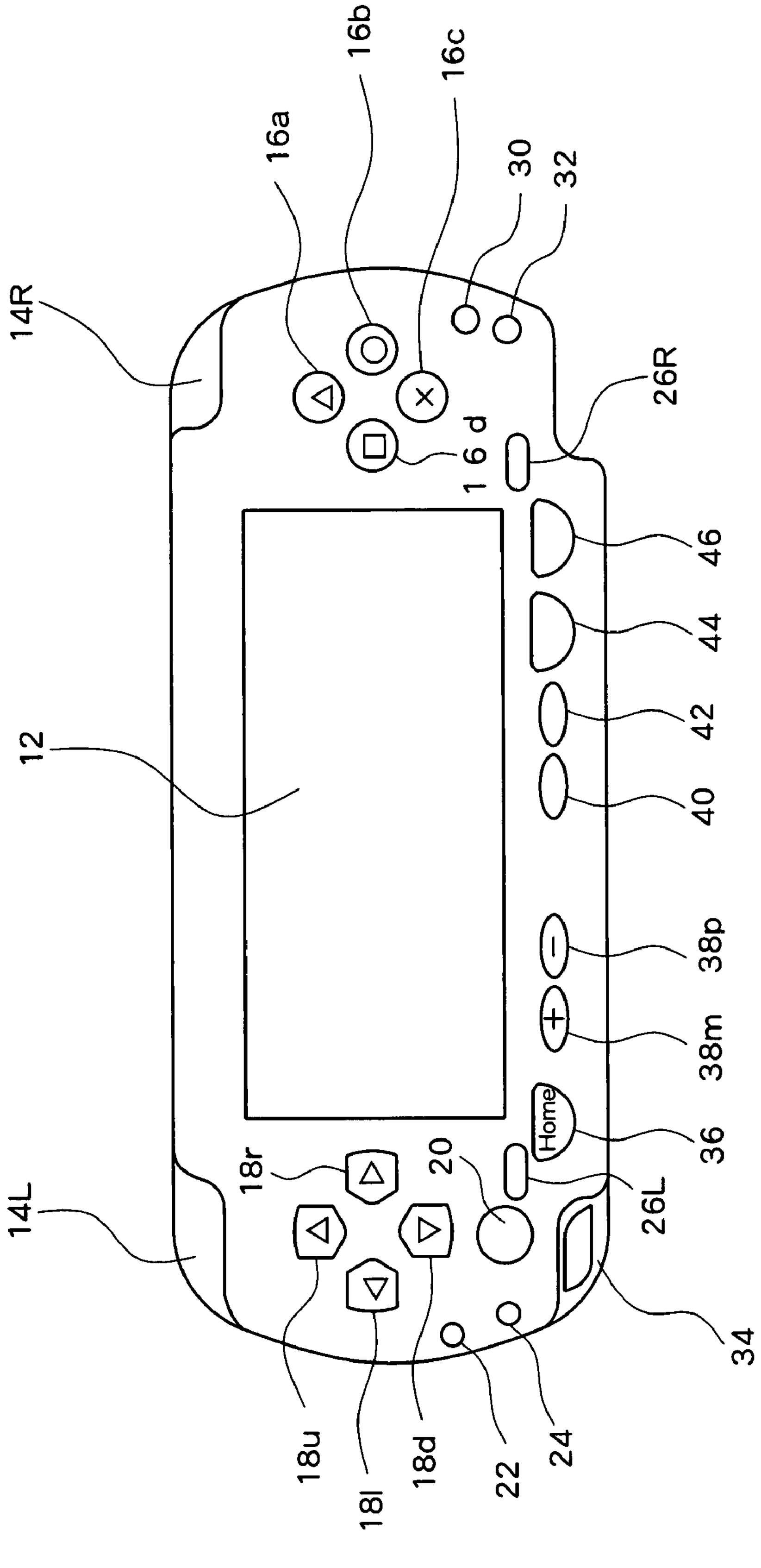
FIG. 1 is a diagram showing the front external appearance of a portable electronic device (an image display device) according to an embodiment of the present invention.

FIG. 1 is a diagram showing the front external appearance of a portable electronic device, or an image display device according to an embodiment of the present invention. The portable electronic device 10 shown in FIG. 1 has an enclosure having a thin box-like shape lengthwise in the lateral direction with the right and left ends thereof rounded like an arc, in which a liquid crystal display 12 is mounted at the middle thereof. Push buttons 16*a*, 16*b*, 16*c*, 16*d* are provided on the right end of the liquid crystal display 12; direction keys 18*u*, 18*r*, 18*d*, 18*l* are provided on the left end thereof.

The user can operate the buttons 16 and the direction keys 18 using his/her thumbs while grasping the enclosure on both sides thereof using both of his/her hands and looking at the liquid crystal display 12. Push buttons 14L, 14R are provided on the top left and right portions of the enclosure, respectively, to be operated by the user using his/her respective index fingers. In addition, a pad 20 is mounted on the lower side of the direction key 18. The pad 20 can be desirably slit in all directions parallel to the front surface of the enclosure, and operation data indicative of the sliding direction and amount can be input to the portable electronic device 10.

A memory access indicator 22 and a communication access indicator 24 are provided on the left edge on the front surface of the enclosure. These are formed each comprising a light emitting device such as an LED or the like. The memory access indicator 22 emits light when a storage medium is inserted into an insertion opening (not shown) defined on the left side surface of the enclosure, and is accessed. This portable electronic device 10 incorporates a wireless LAN communication function. The communication access indicator 24 remains illuminated while connection for communication is maintained.

Meanwhile, a power indicator 30 and a hold indicator 32 are provided on the right edge on the front surface of the enclosure. These are also formed each comprising a light emitting device such as an LED or the like. When the portable electronic device 10 is powered by operating the power/hold switch (not shown) provided on the right side surface of the enclosure, the power indicator 30 is illuminated. When the portable electronic device 10 is set in a specific operating state by operating that switch, the hold indicator 32 is illuminated.

Below the liquid crystal display 12 are provided a home button 36, sound volume buttons 38*m*, 38*p*, a screen button 40, a sound button 42, a selection button 44, and a start button 46. The home button 36 is used to display a home screen on the liquid crystal display 12. In particular, depressing the home button 36 during execution of an application program, such as a game program, or the like, enables the display of an information screen on the liquid crystal display 12. It should be noted here that the information screen is a forcibly inserted (imposed) information screen that presents information such as the current time and date, the residual battery power, the sound volume presently set, and so forth, or operation guidance for terminating the application program currently run in the background. Then, depressing the home button 36 while the information screen is displayed enables suspension of the current display of the information screen and retrieval of the previous application screen.

The sound volume buttons 38*m*, 38*p* are used for adjusting the volume of sound output from the speakers 26L, 26R. The screen button 40 is used for adjusting the brightness of the liquid crystal display 12. Depressing the screen button 40 switches the brightness of the liquid crystal display 12 among low, medium, and high settings. When the liquid crystal display 12 is set at high brightness and the screen button 40 is then depressed, the above-described information screen image will appear on the liquid crystal display 12. It should be noted that the change in brightness and display of the information screen by depressing the screen button 40 is applicable also while the application program, such as a game program, or the like, is being run.

The sound button 42 is used for turning on/off the sound output from the speakers 26L, 26R. The selection button 44 is used for selecting an item in the menu displayed on the liquid crystal display 12. The start button 46 is used mainly for starting a game while the game program is being run by the portable electronic device 10.

Figure 2:
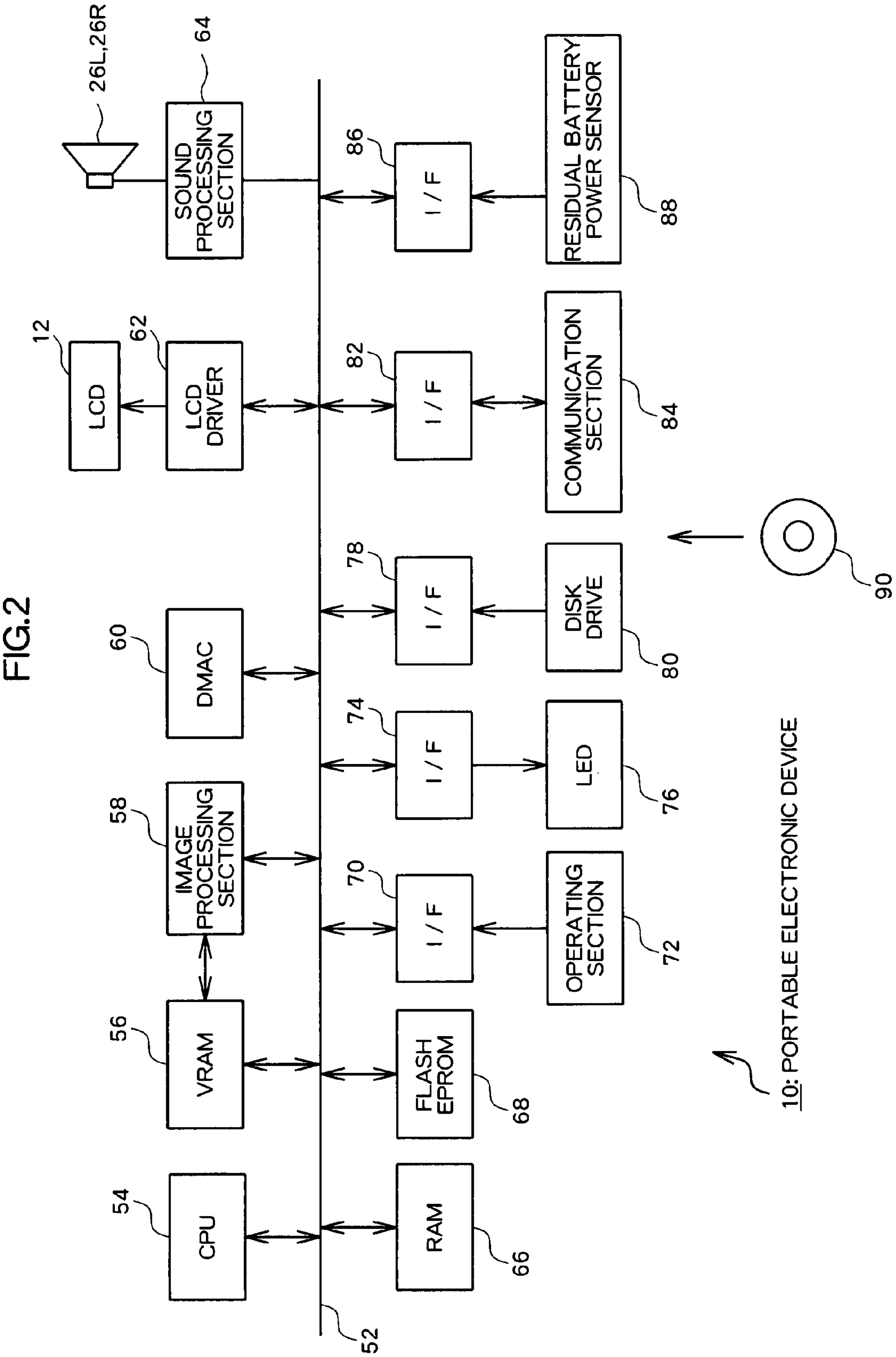
FIG. 2 is a diagram showing the hardware structure of a portable electronic device according to an embodiment of the present invention.

Speaker 26L and speaker 26R are provided on the left and right sides of the liquid crystal display 12, respectively. This arrangement enables output of stereo sound. A ring-like strap holder 34 is mounted on the lower left side of the enclosure, to which a strap for allowing the user to carry the portable electronic device FIG. 2 is a diagram showing the hardware structure of a portable electronic device 10. As shown in FIG. 2, the portable electronic device 10 is a computer comprising a CPU (central processing unit) 54, VRAM 56, an image-processing section 58, a DMAC (direct memory access controller) 60, an LCD driver 62, a sound-processing section 64, RAM (random access memory) 66, flash EPROM (erasable programmable read-only memory) 68, and interfaces (I/F) 70, 74, 78, 82, 86, these elements being mutually connected via a bus 52 for data communication.

An operating section 72 is connected to the interface 70, and an LED 76 is connected to the interface 74. A disk drive 80 is connected to the interface 78. The disk drive 80 is mounted on the back surface (not shown) of the enclosure. A communication section 84 is connected to the interface 82; a residual battery power sensor 88 is connected to the interface 86. Speakers 26L and 26R are connected to the sound-processing section 64. A liquid crystal display (LCD) 12 is connected to the image-processing section 62. These sections are all accommodated in the enclosure of the portable electronic device 10, together with a battery, so that the portable electronic device 10 can be driven by the battery, and is thereby made portable.

The CPU 54 controls the respective sections of the portable electronic device 10 based on the operating system (OS) stored in the flash EPROM 68 or a program read from the disk 90. In particular, the CPU 54 executes a game program stored on the disk 90, an information screen image program, an operation management program, and a main program, all stored in the flash EPROM 68. These programs stored in the flash EPROM 68 may be stored in the flash EPROM at the time of shipment from a factory 68, or read from the disk 90 and stored in the flash EPROM 68.

The bus 52 is used for exchanging addresses and data among the respective sections of the portable electronic device 10. A program read from the disk 90 is written into the RAM 66 as needed. The RAM 66 may be used also as the working memory of the CPU 54, and in particular here, as a display buffer (a single buffer) for an information screen image.

In this portable electronic device 10, the display buffer for an information screen image is ensured in the RAM 66 in the form of a single buffer, or a buffer having a storage region capable of storing only one screen image so that an application program, such as a game program or the like, can use as many resources as possible, such as RAM 66, VRAM 56, or the like. As an information screen image is rendered in the single buffer in the RAM 66, rendering of the information screen image is carried out during a vertical blank period for the liquid crystal display 12, as described later. In this manner, the information screen image in the process of being rendered is prevented from being displayed on the liquid crystal display 12.

The sound-processing section 64 reproduces a variety of sound data, such as game music, game sound effects, messages, or the like, read from the disk 90, and outputs stereo sound via the speakers 26L, 26R. VRAM (video random access memory) 56 is a storage means used as a display buffer for storing one or more display information screen images.

Here, an application program such as a game program, or the like, is designed so as to render, for every frame time (for example, every 1/60 second), an application screen image alternately into a double buffer, or a display buffer using a storage area for two image screen images, ensured in the VRAM 56 so that the application screen image for each frame is alternately read therefrom to be displayed on the liquid crystal display 12. While an application screen image is being read from one buffer, an application screen image to be displayed in the next frame time is rendered into the other buffer. Thus, an application screen image can be created and rendered into the buffer within one frame time, separate from an information screen image. In this manner, the display process for an application screen image can be carried out utilizing abundant resources, compared to an information screen image.

The image-processing section 58 renders a display screen image into the VRAM 56 according to instructions sent from the CPU 54. The DMAC 60 reads the display screen image stored in the VRAM 56 or a display screen image stored in the RAM 66 without using the CPU 54, and supplies the image to the LCD driver 62. The LCD driver 62 displays the display screen image supplied by the DMAC 60 on the liquid crystal display 12.

The interfaces 70, 74, 78, 82, 86 each relay data communication between the CPU 54 and the operating section 72, the LED 76, the disk drive 80, the communication section 84, and the residual battery power sensor 88, respectively. The operating section 72 serves as an input means by which the user performs a variety of operations, and comprises operating members, including push buttons 14, 16, a direction key 18, a pad 20, a home button 36, a sound volume button 38, a screen button 40, a sound button 42, a selection button 44, a start button 46, and so forth.

Operation data describing content of the operation carried out relative to these operating members (e.g., presence or absence of an operation, the amount of operation, the operational direction, and so forth) is supplied via the interface 78 to the CPU 54. The LED 76 serves to notify the user of the status of the portable electronic device 10 and is provided here to the memory access indicator 22, the communication access indicator 24, the power indicator 30, and the hold indicator 32. The disk drive 24 reads a program and data stored on the disk 27, or a computer readable information storage medium, according to the instructions sent from the CPU 54.

The communication section 30 serves to enable data communication with another computer (an information processing device) via a communication network and has wireless LAN functions, for example. The residual battery power sensor 88 detects the residual battery power of the portable electronic device 10 and supplies the detected results via the interface 86 to the CPU 54.

It should be noted that, although it is described above that a program is supplied to the portable electronic device 10 via a disk 90 or an information storage medium, the program may alternatively be supplied from a remote location to the portable electronic device 10 via a communication network such as the Internet. Still alternatively, the program may be supplied to the portable electronic device 10 by utilizing a variety of data communication means such as an infrared-ray communication.

In the following, a technique is described for displaying an information screen instead of a game screen, on a liquid crystal display 12 by pressing the home button 36 once or the screen button 40 twice or more frequently (four times here) while the game program is being executed by the portable electronic device 10 having the above-described external appearance and hardware structure, that is, while the game screen continues to be displayed on the liquid crystal display 12.

Figure 3:
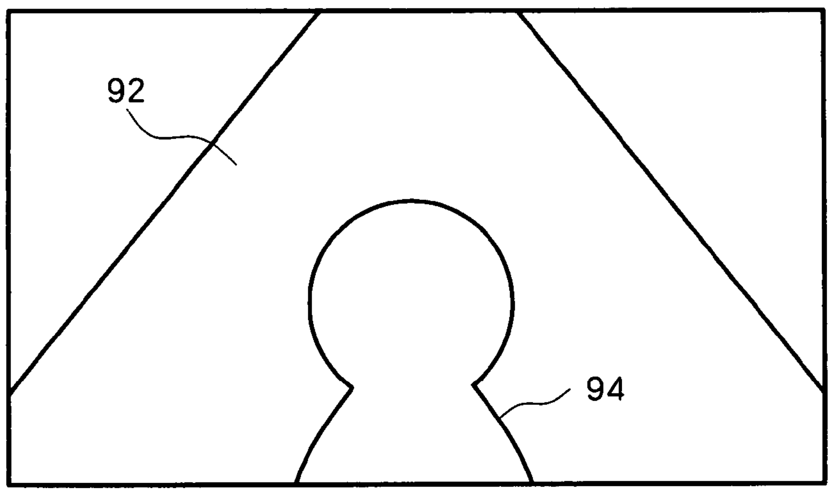
FIG. 3 is a diagram showing one example of an application screen image.

FIG. 3 shows one example of a game screen image to be displayed on a liquid crystal display 12. The game screen image is displayed on the liquid crystal display 12 when a game program stored on a disk 90 is executed by the CPU 54. According to this game program, a virtual three-dimensional space is ensured in the RAM 66 so that a road object 92 and a player character object 94 are arranged in that space. The position and posture of the player character object 94 in the virtual three-dimensional space can be changed for every predetermined period of time by operating the operating member of the portable electronic device 10. Here, the position of the player character object 94 in the virtual three-dimensional space can be changed in particular by using the direction keys 18*u*, 18*r*, 18*d*, 18*l* so as to direct the object in the forward direction from the player character 94, toward the right side relative to the forward direction, toward the opposite direction relative to the forward direction, and toward the left side relative to the forward direction, respectively. A virtual camera is placed in the virtual three-dimensional space, and the status of the virtual three-dimensional space viewed through the virtual camera is incorporated into an image for every predetermined period of time and displayed on the liquid crystal display 12. FIG. 3 shows one example of this image.

Figure 4:
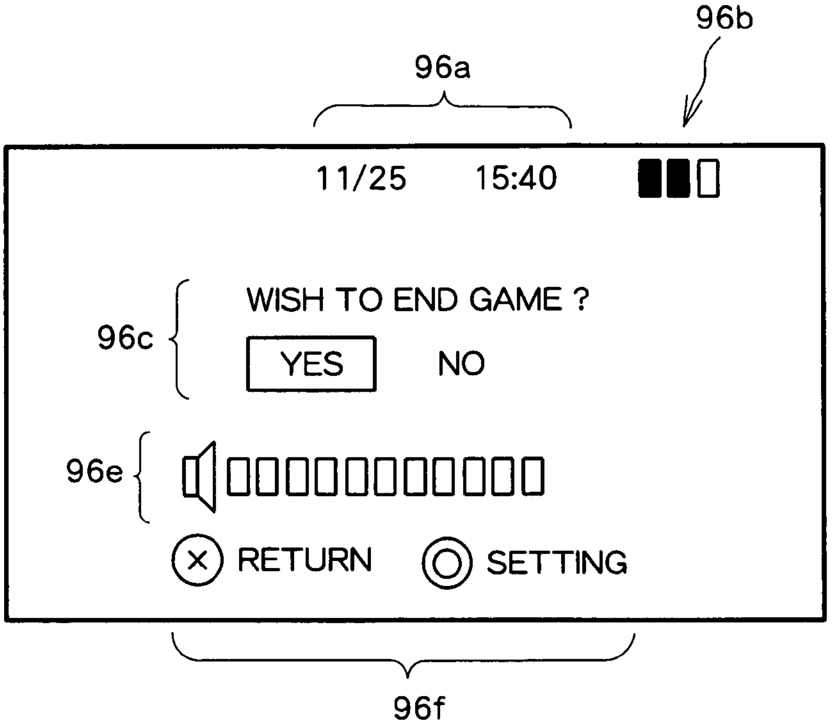
FIG. 4 is a diagram showing one example of an information screen image.

When the home button 36 is pressed or the screen button is pressed a predetermined number of times while such a game screen image is displayed on the liquid crystal display 12, an information screen image appears on the liquid crystal display 12. FIG. 4 shows one example of the information screen image. The information screen image contains a plurality of element images 96*a* through 96*f*. Specifically, the element image 96*a* indicative of the current time and date is created based on output from a clock (not shown) incorporated in the portable electronic device 10 and from a calendar function. The element image 96*b* indicative of the residual battery power is created based on the residual battery power data output from the residual battery power sensor 88.

The element image 96*c* is created comprising text data (“Wish to end game?”, “YES” and “NO”) prepared in advance with a cursor shown on either “YES” or “NO”. The cursor is moved to the text on the right side in response to the operation of direction key 18*r*, and to the text on the left side in response to operation of direction key 18*l*. The element image 96*e* indicates the volume of sound currently set in the portable electronic device 10. The volume value is managed by the flash EPROM 68 so as to decrease within a predetermined range (e.g., 0 through 255) in response to sound volume button 38*m* being depressed, and to increase in response to sound volume button 38*p* being depressed. In the portable electronic device 10, the element image 96*e* is created based on the current volume value managed by the flash EPROM 68.

The element image 96*f* is an operation guidance image indicating that the game screen is being retrieved when push button 16*c* is depressed and that a process according to the position of the cursor in the element image 96*c* is being carried out when push button 16*b* is depressed. That is, when the cursor is situated on "YES" of the element image 96*c* and push button 16*b* is depressed, the current game program is terminated and the main screen (not shown) is retrieved. On the other hand, when the cursor is situated on "NO" of the element image 96*c* and push button 16*b* is depressed, the game screen image created according to the current game program is retrieved.

On the portable electronic device 10, the information screen image is divided into a plurality of element images as described above, and rendered in the display buffer for the information screen image prepared in the RAM 66 on an element image to element image basis.

FIG. 5 shows the rendering flag table used in the above. The rendering flag table is stored in the RAM 66, for associating an element image ID and a rendering flag, in which the element image ID is used to identify each element image 96, and the rendering flag is used to indicate that the element image 96 identified by that element image ID is already rendered in the display buffer and that the re-rendering thereof is therefore unnecessary. In other words, rendering flag "1" means that the element image 96 identified by the element image ID is already rendered in the display buffer and that the re-rendering thereof is therefore unnecessary; the rendering flag "0" means that the element image 96 must be rendered or re-rendered in the display buffer.

In the rendering flag table, the element image IDs are listed in the order to be rendered so that the rendering process relative to the display buffer is carried out beginning with the element image identified by the element image ID ranked highest in the order and having the rendering flag "0" in the rendering flag table. The rendering process relative to the display buffer is carried out during a vertical blank period of the liquid crystal display 12. Each time the rendering process relative to the element image 96 selected based on the rendering flag table is complete, the residual time of the vertical blank period is checked. When it is determined that the residual time is equal to, or longer than, a predetermined period of time, the element image 96 to be rendered next in the display buffer is selected based on the rendering flag table.

Furthermore, suppose that an operation for displaying an information screen is carried out by, for example, depressing the home button 36 while the game screen shown in FIG. 3 is displayed on the liquid crystal display 12. In the above case, the game screen displayed on the liquid crystal display 12 instantly switches to the information screen. Moreover, when any of the direction keys 18*u*, 18*r*, 18*d*, 18*l*, and buttons 16*a*, 16*b*, 16*c*, 16*d*, 14L, 14R (hereinafter referred to as an application priority operation member) is operated, the operation data input using these application priority operation members continues to be used for the game program. That is, the game program continues to update the game screen image according to the operation data input using the application priority operation member, and during that period, the operation data input using the application priority operation member is not used for updating the information screen image.

Then, when the information screen image creation program detects a situation in which none of the application priority operation members is operated after an operation to display the information screen image is carried out, the program instructs the operation management program (to be described later) to store the operation invalidation flags in a manner in which they are associated with their respective application priority members.

FIG. 6 is a diagram showing the relationship between the operation invalidation flag and the operation data. Once operation data is input via the operating section 72, the operation data OP1-OPn relevant to the respective operating members is stored in the operation data buffer secured in the RAM 66, according to the operation management program executed by the CPU 54. Then, when an instruction requesting setting of an operation invalidation flag is sent from the information screen image creation program, an operation invalidation flag Fx indicating that the relevant operation should be invalidated is stored in a manner in which it is associated with the operation data OPx (x being any number from 1 through n, corresponding to an application priority operation member), among data stored in the operation data buffer 102, which is input using the application priority operation member. It should be noted that a flag indicating that the concerned operation should not be invalidated is stored with respect to other operation data.

With the operation invalidation flag set as described above, operation data indicating that the relevant application priority operation member is not being operated is delivered to the game program even though the application priority operation member is actually being operated, such as, being depressed. Meanwhile, operation data indicating that the application priority operation is actually being operated is delivered to the information screen image creation program.

As described above, even when an operation to display an information screen is carried out while a game is being played, game operation can be continued using the application priority operation members until operation relative to all of the application priority operation members is terminated. Once operation relative to all of the application priority operation members is terminated, it is thereafter possible to carry out an operation relative to the information screen, using these operating members.

FIG. 7 shows a program relevant to the present invention among programs to be run by the portable electronic device 10. As shown in FIG. 7, the portable electronic device 10 executes a game program (an application screen image creation program) 104, an information screen image creation program 106, a main program 108, and an operation management program 110. The game program creates a game screen image for every predetermined period of time, and stores the image in the display buffer in the VRAM 56. The information screen image creation program 106 detects—even while the game program 104 is being executed—the fact that an operation to display an information screen is being carried out by, for example, depressing the home button 36. Then, when it is determined that an operation to display an information screen is being carried out, an information screen image is created as described above and rendered into a dedicated display buffer in the RAM 66. Moreover, at the timing when the vertical blank period begins, an object to be displayed on the liquid crystal display 12 switches from the game screen image stored in the VRAM 56 to the information screen image stored in the RAM 66. As described above, the information screen is displayed on the liquid crystal display 12 in place of the game screen.

Then, after the operation to display the information screen is carried out, the status of operation of the application priority operation members is monitored, and when a situation arises in which none of the application priority operation members is being operated, the operation management program 110 is instructed to set an operation invalidation flag. Moreover, when the situation arises in which none of the application priority operation member is operated, update of the information screen then begins according to the operation data input using the application priority operation members.

The operation management program 110 causes the operation data input by the operating section 72 to be stored in the operation data buffer in the RAM 66. In addition, the operation invalidation flag is stored in a manner in which it corresponds to each of the operation data according to the instruction sent by the information screen image creation program 106 or the like. Furthermore, when the game program 104 instructs delivery of the operation data, the operation data is modified according to the operation invalidation flag corresponding to that operation data, and is then delivered to the game program 104. On the other hand, when the information screen image creation program 106 instructs delivery of the operation data, the operation data input from the operating section 72 is delivered intact.

The main program 108 is a program for displaying a main information screen (not shown) for activating the respective functions of a portable electronic device 10, such as activation of a game program, or the like.

In the following, an information screen-related process carried out according to the information screen image creation program 106 will be described in detail.

Figure 8:
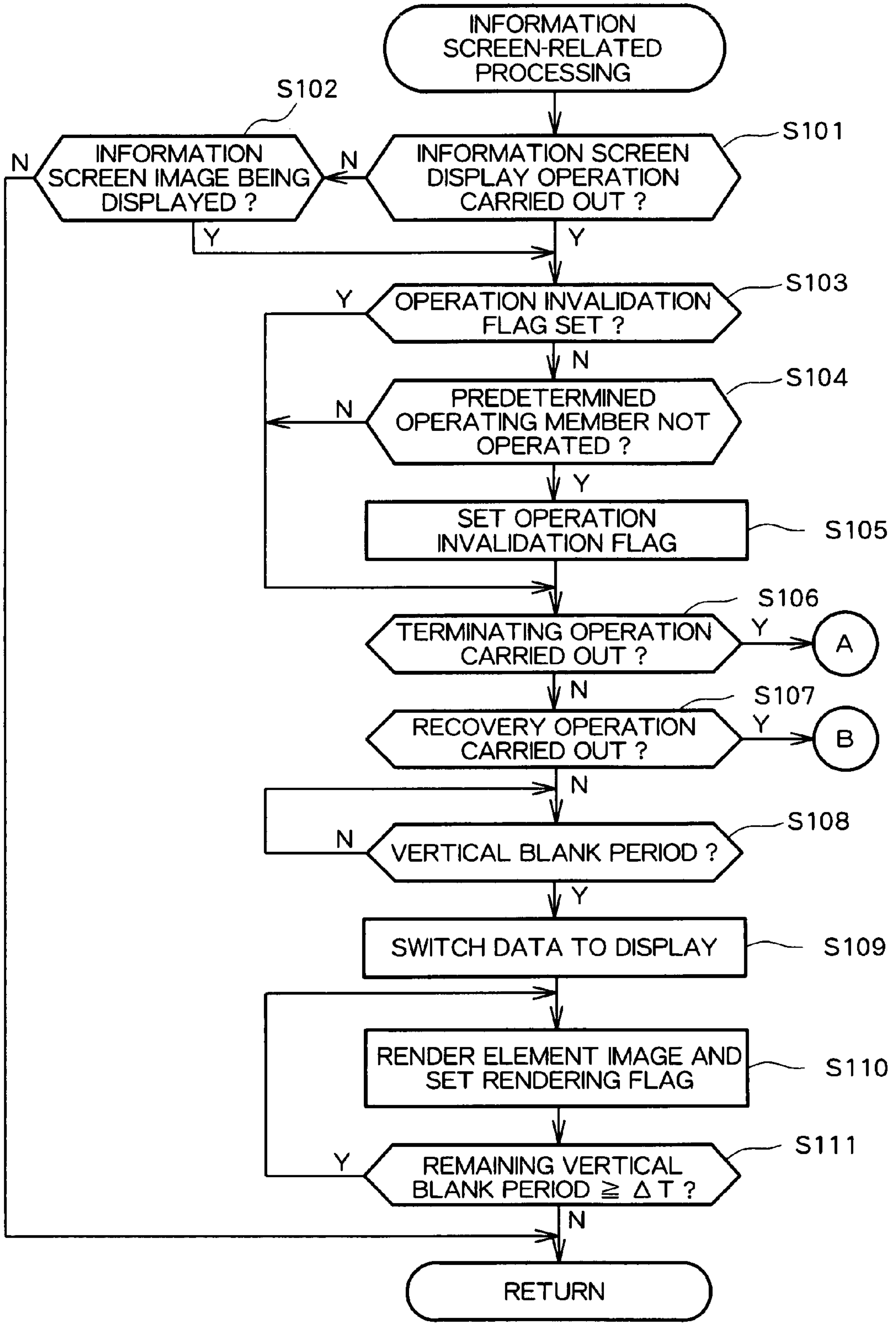
FIG. 8 is a flowchart showing an information screen-related process.
Figure 9:
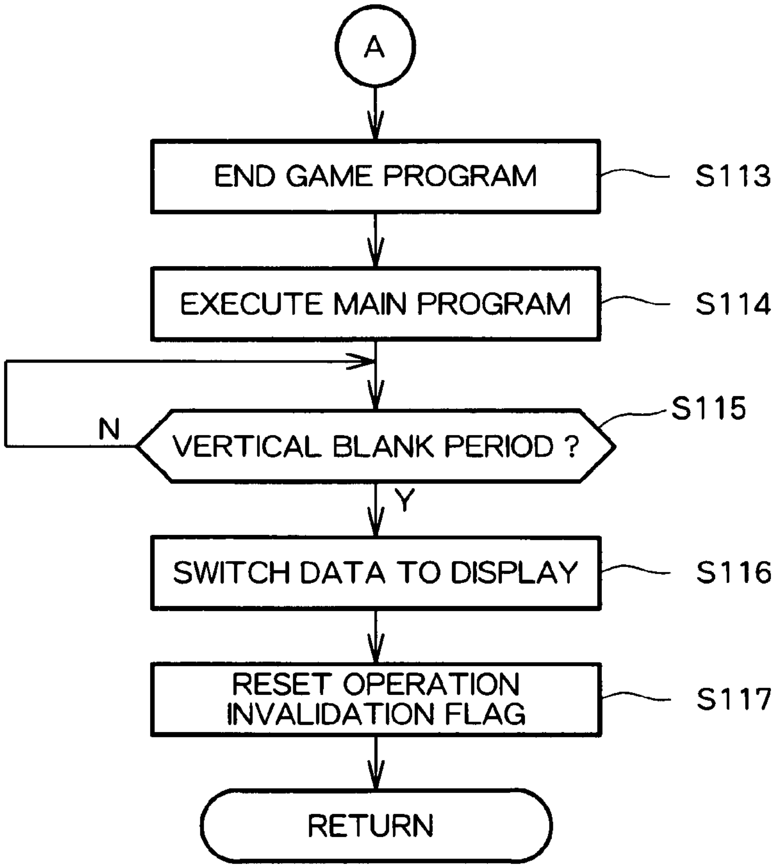
FIG. 9 is a flowchart showing an information screen-related process.
Figure 10:
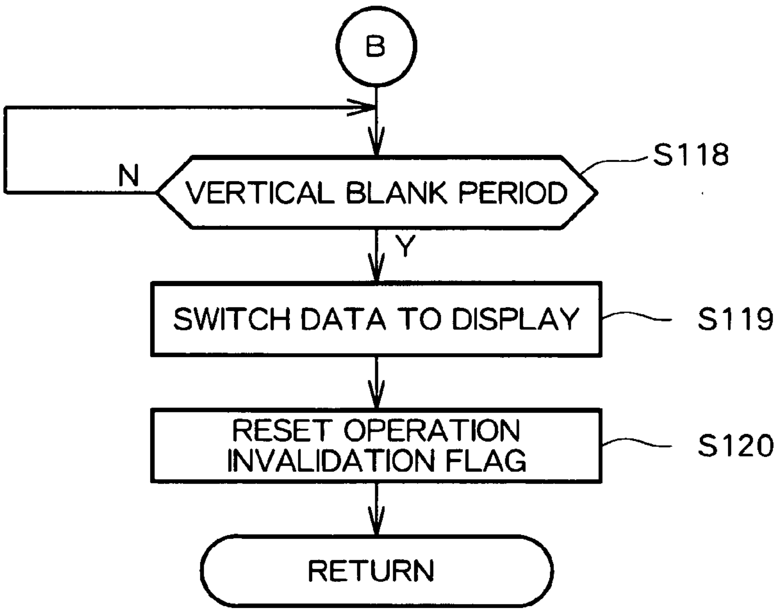
FIG. 10 is a flowchart showing an information screen-related process.

FIGS. 8 through 10 show a flowchart of the information screen-related process to be carried out, in each frame time, after confirmation of termination of the process due in the frame period according to an application process such as a game program or the like. An application screen image creation process according to an application program such as a game program or the like continues, for every frame time, even while the information screen-related process is carried out. Therefore, the application screen can be displayed any time on the liquid crystal display 12, instead of the information screen, in response to a predetermined retrieving operation.

In the information screen-related process, operation data stored in the operation data buffer is read, and then depending on whether an operation to display an information screen, such as pressing the home button 36 or the like is being carried out is determined (S101). When it is determined that such an information screen display operation is not being carried out, it is determined whether an information screen is currently being displayed on the liquid crystal display 12 (S102). When an information screen is not currently displayed, the information screen-related process is terminated.

On the other hand, when it is determined that an information screen display operation is carried out (S101) or when an information screen is currently being displayed (S102), it is determined (S103) whether the operation management program 110 has been instructed to set an operation invalidation flag. When such an instruction is yet to be made, it is determined whether none of the application priority operation members are currently being operated based on the operation data stored in the operation data buffer (S104). When none of the application priority operation members is currently being operated, the operation management program 110 is instructed to set an operation invalidation flag in a manner in which it corresponds to the operation data input using the application priority operation members (S105). On the other hand, when it is determined in S103 that an instruction requesting setting of an operation invalidation flag has already been made, the processes in S104 and S105 are skipped.

Thereafter, it is determined whether a terminating operation is being carried out relative to the information screen being carried out according to the content stored in the operation data butter and the position of the cursor in the element image 96*c* (S106). It should be noted that a terminating operation is effected by clicking push button 16*b* with the cursor situated on the text "YES". When it is determined that the terminating process is being carried out, the game program is instructed to terminate the game program (S113 in FIG. 9), and execution of the main program thereafter begins (S114). Specifically, the game program thus instructed carries out a terminating process prepared in advance during the game program.

Thereafter, arrival of a vertical blank period is monitored (S115). With the vertical blank period arrives, the object displayed on the liquid crystal display 12 switches from content stored in the display buffer for information screen image, secured in the RAM 66 (i.e., an information screen image) to content stored in the display buffer secured in the VRAM 56 (i.e., a main screen image) (S116). Then, the operation management program 110 is instructed to reset the operation invalidation flag (S117) before terminating the information screen-related process.

Referring to FIG. 8, when it is determined in S106 that the terminating operation is not being carried out, it is determined whether a recovery operation is being carried out relative to the information screen according to content stored in the operation data buffer and the position of the cursor on the element image 96*c* (S107). It should be noted that a recovery operation is effected by pressing the push button 16*b* with the cursor situated on the text "NO" or by pressing the push button 16*c* irrespective of the position of the cursor. Furthermore, pressing the home button 36 with the information screen displayed is also considered to constitute a recovery operation.

When it is determined that a recovery operation is being carried out, arrival of a vertical blank period is awaited (S118 in FIG. 10), and the image displayed on the liquid crystal display 12 switches from content in the display buffer for an information screen image secured in the RAM 66 (i.e., an information screen image) to content in the display buffer in the VRAM 56 (that is, a game screen image) (S119). Moreover, the operation management program 110 is instructed to reset the operation invalidation flag (S120) before terminating the information screen-related processing.

Returning to FIG. 8, when it is determined in S107 that a recovery operation is not being carried out, arrival of a vertical blank period is awaited (S108), and the image to be displayed on the liquid crystal display 12 switches from content in the display buffer secured in the VRAM 56 (i.e., a game screen image) to content in the display buffer for information screen image secured in the RAM 66 (i.e., an information screen image) (S109). Then, as described above, one element image is selected based on the rendering flag table and is rendered into the display buffer for the information screen image secured in the RAM 66. Thereafter, the fact that rendering of the element image has been completed is reflected in the rendering flag table (S110). Thereafter, the residual period of time in the vertical blank period is checked. The process in S110 is repeated (S111) when it is determined that the period of time is equal to, or longer than a predetermined period of time. On the other hand, when the residual period of time is shorter than the predetermined period of time, the information screen-related process is terminated.

According to the above-described portable electronic device 10, element images that have been rendered into the display buffer and element images yet to be rendered into the display buffer are differentiated using a rendering flag, and a rendering process is carried out only with respect to the element image yet to be rendered. This arrangement can conserve the rendering process so that a larger number of element images 96 can preferably be rendered. Furthermore, when re-rendering is necessary, the relevant rendering flag is forcibly set to zero so that the element image corresponding to the rendering flag can be forcibly re-rendered. In this manner, display of some or all of the element images can be updated.

The portable electronic device 10 carries out—while repeating for every predetermined period of time—an information screen image creation process and a game screen image creation process within a predetermined period of time (a frame time). In the above, in each frame time, the game screen image creation process is carried out prior to the information screen image creation process, and the information screen image creation process is carried out after the game screen image creation process due in that frame time is terminated. Then, the screen images are stored in different storage areas (the information screen image is stored in the RAM 66; the game screen image is stored in the VRAM 56) in the respective processes, so in response to an operation to display an information screen, the image to be displayed on the liquid crystal display 12 is switched from the game screen image stored in the VRAM 56 to the information screen image stored in the RAM 66. Then, when an operation to release information is carried out, the image displayed on the liquid crystal display 12 switches from the information screen image stored in the RAM 66 to the game screen image stored in the VRAM 56.

With this arrangement, the game screen image creation process is not affected by the ongoing creation and display of information screen images, even while information screen images are being created and displayed, and the information screen images can preferably be displayed while the game is being played.

Furthermore, according to the portable electronic device 10, once an operation to display an information screen, such as pressing the home button 36 or the like, is carried out, operation data that is input using the application priority operation members—namely, the direction keys 18*u*, 18*r*, 18*d*, 18*l*, and the push buttons 16*a*, 16*b*, 16*c*, 16*d*, 14L, 14R—are thereafter continued to be used by the game program until detection of a situation in which none of these application priority operation members is being pressed. In this case, the operation data that is input using these application priority operation members is not used for updating of information screen currently being displayed, or in other words, movement of the cursor on the element image 96*c*. Then, when a situation is detected by the portable electronic device 10 in which none of the application priority operation members is being pressed, an operation invalidation flag is stored corresponding to the operation data input using the application priority operation member.

In this case, as for the operation data with respect to which an operation invalidation flag is set, operation data indicating that no operation is being carried out is delivered to the game program even though operation data indicating that an operation is being carried out is actually input. On the other hand, operation data that is input using the respective operating members is delivered intact, irrespective of the operation invalidation flag, to the information screen image creation program so that the information screen image creation program creates an information screen image according to operation data that is not modified according to the operation invalidation flag.

In this manner, when an information screen is displayed while an application such as a game or the like is being displayed, operation relative to the application using these operating members can be continued under a certain condition, or in other words, until a situation is detected in which none of the application priority operation members is being operated.

It should be noted that the present invention is not limited to the above-described embodiment and can be applied to any computer, for example, other than the portable electronic device 10.

What is claimed is:

1. An image display device, comprising:

an operation unit having a plurality of operating members configured to input operation data indicative of content of a user's direct operation of each of said operating members;

an operation data storage unit configured to store said operation data indicative of said content of operation relative to each of said operating members and input via said operation unit;

an application process execution unit configured to execute a predetermined application process based on said operation data stored in said operation data storage unit;

an information screen display operation detection unit configured to detect a predetermined information screen display operation;

an information screen display unit configured to display an information screen in a display unit when said information screen display operation detection unit detects information screen display operation; and an operation invalidation flag storage unit configured to store an operation invalidation flag in a manner in which the operation invalidation flag corresponds to a part or all of the operation data stored in said operation data storage unit when the operation data input via said operation unit satisfies a predetermined condition when the information screen is displayed in the display unit, wherein said application process execution unit modifies, when the information screen is displayed in the display unit, the operation data stored in said operation data storage unit according to the operation invalidation flag stored in said operation invalidation flag storage unit, and executes said predetermined application process according the operation data modified.

2. The image display device according to claim 1, wherein said information screen display unit updates the information screen according to the operation data stored in said operation data storage unit.

3. An image displaying method, comprising:

an operation data storage step of storing operation data input via an operation unit having a plurality of operation members, for inputting operation data indicative of content of a user's direct operation of each of said operation members, and indicative of said content of operation relative to each of said operating members in an operation data buffer by an operation data storage unit;

an application process execution step of executing a predetermined application process based on operation data stored in an operation data buffer by an application process execution unit;

an information screen display operation detection step of detecting a predetermined information screen display operation by an information screen display operation detection unit;

an information screen display step of displaying an information screen in display unit when the information screen display operation is detected during the information screen display operation detection step by an information screen display unit; and an operation invalidation flag storage step of storing an operation invalidation flag in a manner in which the operation invalidation flag corresponds to a part or all of the operation data stored in said operation data storage unit when the operation data input via said operation unit satisfies a predetermined condition when the information screen is displayed in the display unit by an operation invalidation flag storage unit, wherein during the application process execution step, when the information screen is displayed in the display unit, the operation data stored in said operation data storage unit is modified according to the operation invalidation flag stored in said operation invalidation flag storage unit, and said predetermined application process is carried out according to the operation data modified.

4. A non-transitory, tangible computer readable information storage medium storing a program for causing a computer to:

input operation data indicative of content of a user's direct manipulation of each of a plurality of operating members by an operation unit having said operating members;

store the operation data indicative of said content of operation relative to each of the operating members and input via said operation unit by an operation data storage means for;

execute a predetermined application process based on operation data stored in said operation data storage unit by an application process execution unit;

detect a predetermined information screen display operation by an information screen display operation detection unit;

display an information screen in display unit when said information screen display operation detection unit detects information screen display operation by an information screen display unit; and store an operation invalidation flag in a manner in which the operation invalidation flag corresponds to a part or all of the operation data stored in said operation data storage unit when the operation data input via said operation unit satisfies a predetermined condition when the information screen is displayed in the display unit by an operation invalidation flag storage unit, wherein when the information screen is displayed in the display means, the operation data stored in said operation data storage unit is modified according to the operation invalidation flag stored in said operation invalidation flag storage unit by said application process execution unit, and executing said predetermined application process according to the operation data modified by said application process execution unit.

* * * * *